United States Patent [19]

Nagata

[11] Patent Number: 5,081,619
[45] Date of Patent: Jan. 14, 1992

[54] DIGITAL SIGNAL MULTIPLEX COMMUNICATION SYSTEM HAVING SIGNAL PATH MONITORING FUNCTION

[75] Inventor: Yoichi Nagata, Yokosuka, Japan

[73] Assignee: Hitachi, Ltd., Tokyo, Japan

[21] Appl. No.: 433,919

[22] Filed: Nov. 9, 1989

[30] Foreign Application Priority Data

Nov. 11, 1988 [JP] Japan .................. 63-283942

[51] Int. Cl.[5] ............................................. H04L 1/22
[52] U.S. Cl. ..................................... 370/13; 370/102; 371/8.2
[58] Field of Search .......................... 370/13, 17, 102; 371/8.2, 11.2, 49.1

[56] References Cited

U.S. PATENT DOCUMENTS

| | | | |
|---|---|---|---|
| 4,053,715 | 10/1977 | Drapkin | 370/102 |
| 4,393,493 | 7/1983 | Edwards | 370/110.4 |
| 4,479,142 | 10/1984 | Buschman et al. | 370/99 |
| 4,744,082 | 5/1988 | Fujimura et al. | 370/102 |
| 4,888,768 | 12/1989 | Michener | 370/102 |
| 4,964,122 | 10/1990 | Ferguson et al. | 370/105.1 |

OTHER PUBLICATIONS

Al Geigel, "Monitoring the Performance of Digital Multiplex Circuits", Bell Laboratories Record, Aug. 1971, pp. 198–202.

"Fourth-Order Multiplex Equipment Operating at 97728 Kbit/s", CCITT Fascicle III.3-Recommendation B.752, pp. 230-233.

*Primary Examiner*—Douglas W. Olms
*Assistant Examiner*—Melvin Marcelo
*Attorney, Agent, or Firm*—Antonelli, Terry, Stout & Kraus

[57] ABSTRACT

The present invention relates to a digital signal multiplex and communication system having monitoring function of the signal path. The digital path monitoring method according to the present invention comprises step of counting "1"s included in information bits sandwiched by two stuff pulses for each lower-rate signal before multiplexing a plurality of lower-rate signals into one higher-rate signal, step of inserting a parity bit corresponding to the number of "1"s obtained as a result of the connecting step into the latter stuff pulse insertion position of the lower-rate signal which appears just after the counting, step of multiplexing the lower-rate signals with the parity bits inserted, step of transmitting the higher-rate signal obtained as a result of the multiplexing step, step of demultiplexing the higher-rate signal into a plurality of lower-rate signals, step of counting, for each of the lower-rate signals obtained as a result of the demultiplexing step, "1"s included in a information bits sandwiched by two parity bits which are adjacent, step of checking the number of "1"s thus connected with the parity bit which appears just after the counting, and step of judging if the digital path is normal of abnormal on the basis of the result of the checking step.

4 Claims, 10 Drawing Sheets

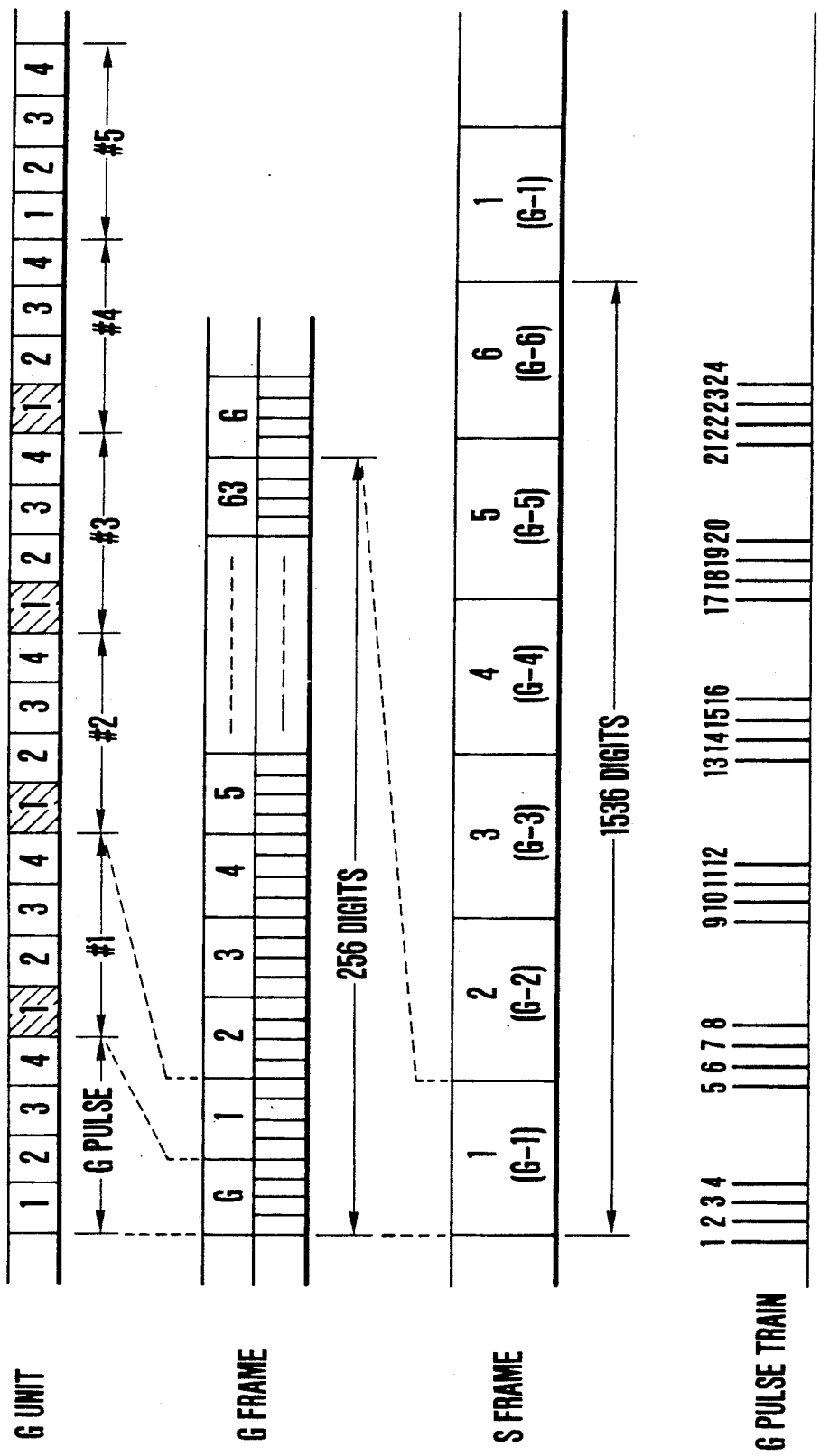

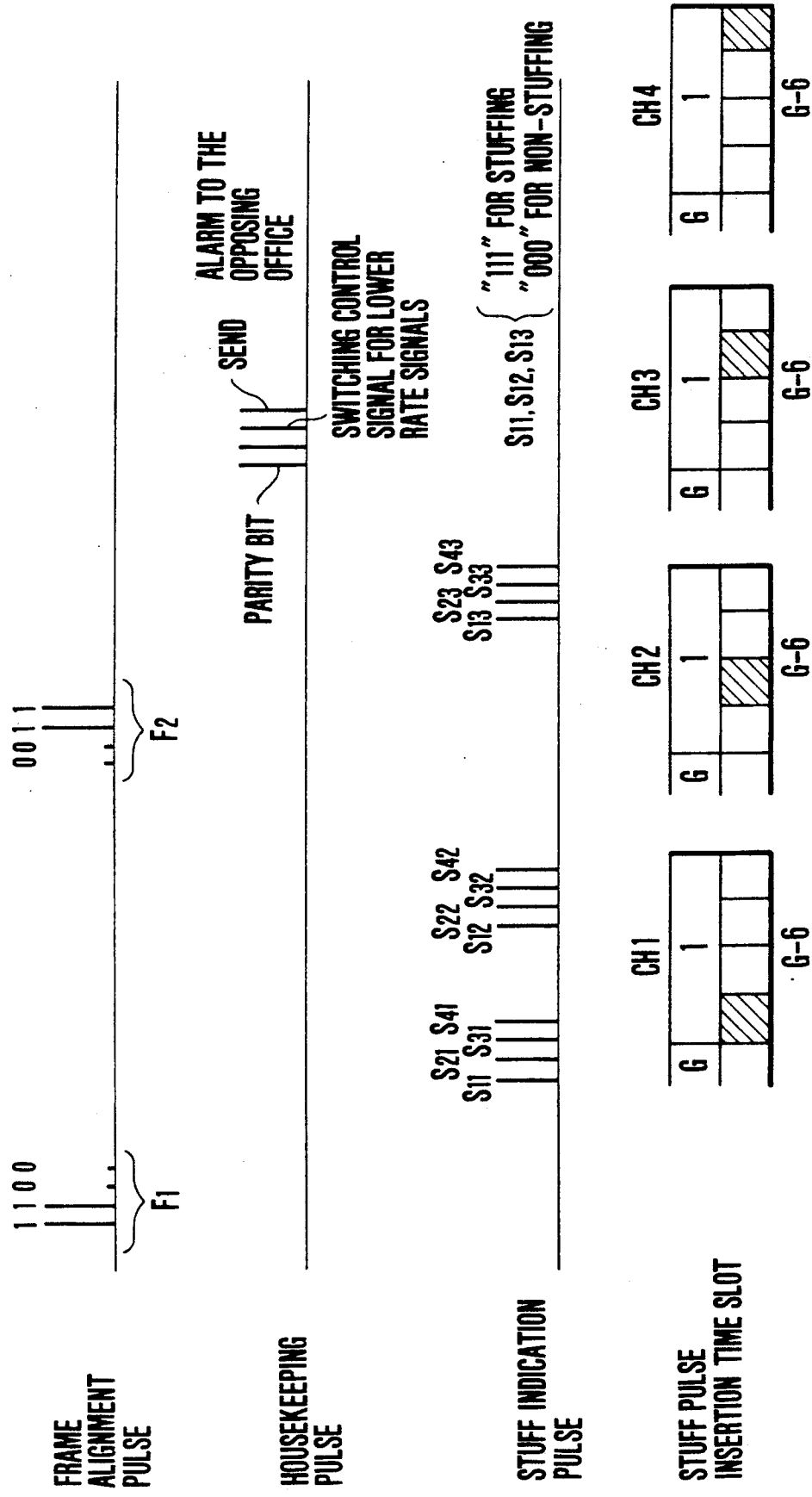

DIGITAL SIGNAL MULTIPLEX COMMUNICATION SYSTEM HAVING SIGNAL PATH MONITORING FUNCTION

BACKGROUND OF THE INVENTION

The present invention relates to a digital path monitoring method whereby bit errors caused in a multiplexer section and a demultiplexer section included in a digital signal multiplex and communication system can be detected, a multiplexer to which this monitoring method has been applied, and a communication system formed by using this multiplexer.

In a digital multiplex transmission system, it is necessary to always monitor the digital path and occurrence of bit error, signal input interruption or from alignment error between opposing multiplexers in order to raise the system reliability. In a conventional monitoring method as described in "Shisetsu", Vol. 31, No. 8, p. 120, for example, parity bit is given on the sending side by counting "1" bits included in each frame of a multiplexed signal, and bit errors are detected at the receiving side by performing similar counting and parity check.

The monitoring method described in the aforementioned paper is capable of detecting transmission errors contained in multiplexed digital signals, but is not capable of detecting bit errors caused in the multiplexing and demultiplexing process itself. As methods for detecting such bit errors caused in the multiplex or demultiplex section, the "In-out check" scheme described in 1979 National Convention Record of the Institute of Electronics and Communication Engineers of Japan, No. 2036, for example, and a scheme as described in Al Geigel, "Monitoring the Performance of Digital Multiplex Circuits" Bell Laboratories Record, August 1971 can be mentioned. In these schemes, however, a higher-rate group signal to be monitored is demultiplexed into lower-rate group signals, and each of these demultiplexed signals is compared with the input lower-rate signal in the multiplex circuit bit by bit. Therefore, a demultiplex circuit and a comparison circuit must be newly added, resulting in a problem of increased hardware.

An object of the present invention is to provide a digital path monitoring method, for a multiplexer using a pulse stuffing technique and a communication system including an asynchronous multiplex function using a simple hardware configuration.

SUMMARY OF THE INVENTION

The above described object is achieved, in performing synchronization for respective inputted asynchronous lower-rate digital signals on the sending side, by counting "1"-bits included in the signal from insertion of a stuff pulse A till insertion of the next stuff pulse B to derive parity information, giving the parity information thus derived to the immediately succeeding stuff pulse (inserting a parity bit (parity information) instead of a stuff pulse, to be exact. However, this parity bit is handled as a stuff pulse when desynchronization is performed.), multiplexing thereafter the lower-rate digital signals with parity information added, transmitting the multiplexed signals to an opposing equipment, counting, in removing stuff pulses in demultiplexed lower-rate signals at the receiving side, "1"-bits included in the signal from extraction of the stuff pulse A till extraction of the next stuff pulse B, and comparing this with information represented by the stuff pulse B extracted immediately thereafter.

Conventional stuff pulses in conventional multiplexers are inserted only for the purpose of performing synchronization for asynchronous input signals. In the present invention, however, stuff pulses inserted into lower rate signals to be multiplexed are provided with parity information, and after demultiplexing, it is checked whether an error is contained in lower-rate signals on the basis of parity information represented by stuff pulses. Therefore, a multiplexer using the digital path monitoring scheme of the present invention has an advantage that it is also capable of monitoring the multiplex and demultiplex section by providing parity insertion means and parity detection means without significantly increasing the amount of hardware.

BRIEF DESCRIPTION OF THE DRAWINGS

FIGS. 6A and 6B show a frame configuration diagram in a DM-45 type multiplexer;

DESCRIPTION OF PREFERRED EMBODIMENTS

An embodiment of the present invention will hereafter be described by referring to drawings.

Figure 2:
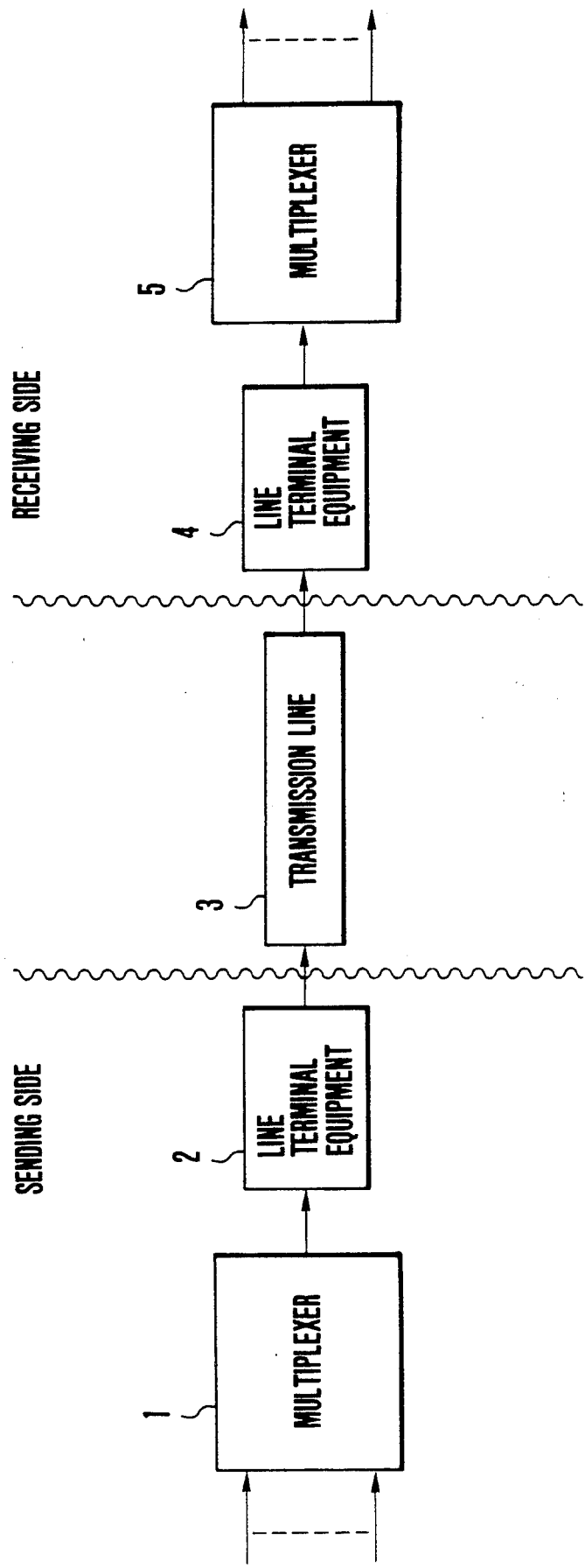
FIG. 2 is a configuration diagram of a communication system.

FIG. 2 is diagram of a whole system. In FIG. 2, numeral 1 denotes a multiplexer on the sending side, 2 a line terminal equipment on the sending side, 3 a transmission path, 4 a line terminal equipment on the receiving side opposing the line terminal equipment 2, and 5 a multiplexer on the receiving side opposing the multiplexer 1 on the sending side. Although each of the multiplexer 1 and 5 and the line terminal equipments 2 and 4 generally has both sending and receiving functions, only a single function is illustrated here for brevity of description.

Figure 1:
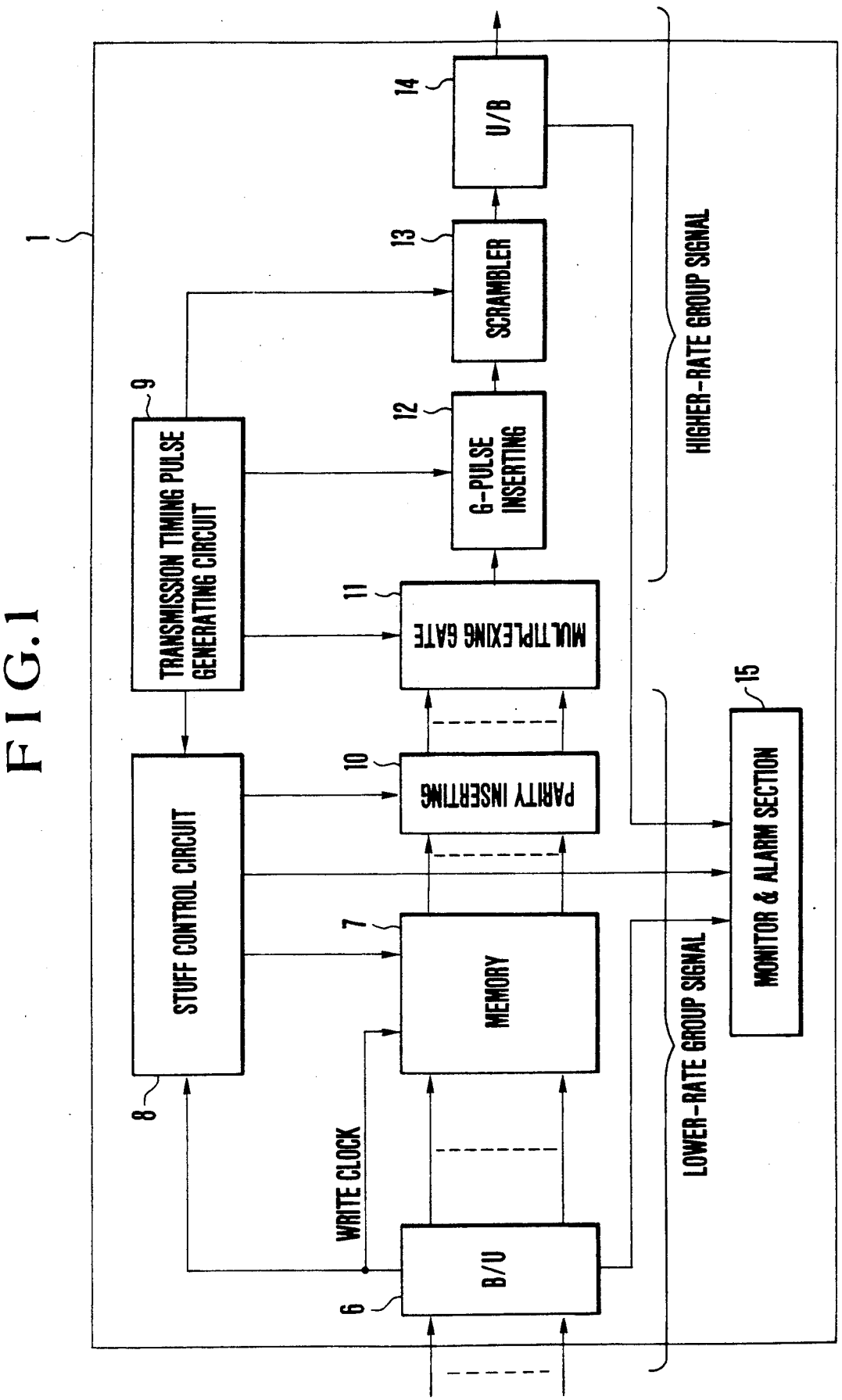
FIG. 1 is a configuration diagram of transmitting function of a multiplexer whereto a digital path monitoring scheme according to an embodiment of the present invention has been applied.

As shown in FIG. 1, the multiplexer 1 on the sending side comprises a bipolar-unipolar converting section 6 for the lower-rate input bipolar signals, a memory 7, a stuff control circuit 8, a timing pulse generating circuit for multiplexing 9, a parity bit inserting circuit 10, a multiplexing gate 11, a G pulse inserting circuit 12, a scrambler 13, a unipolar-bipolar converting section 14 for the output higher-rate bipolar-signal, and a monitor and alarm section 15.

In this configuration, the multiplexer 1 receives a bipolar lower-rate signal transmitted from other equipment (not illustrated) and converts the bipolar signal to an unipolar signal. These unipolar signals are generally not synchronized synchronism and cannot be directly multiplexed. Therefore, these unipolar signals are temporarily written into the memory 7, and are read out by using clock pulses having a frequency slightly higher than that of write clock pulses.

At this time, surplus pulses corresponding to the frequency difference between the write clock and the read clock, i.e., stuff pulses are added to attain synchronization under the control of the stuff control circuit 8. The stuff control circuit 8 compares the phase of the write clock pulses fed from the bipolar-unipolar converting section with the phase of the read clock pulses generated by the timing pulse generating circuit. If the phase difference exceeds one bit, the stuff control circuit 8 shifts the phase of the read clock backward by one bit and inserts a stuff pulse. The stuff pulse insertion position is specified in the multiplexed frame configuration. Concerning the multiplexed frame configuration, the configuration described in "Fourth-order multiplex equipment operating at 97728 Kbit/s", CCITT Fascicle 111.3—Recommendation G. 752 can be applied to the present invention.

Figure 5:
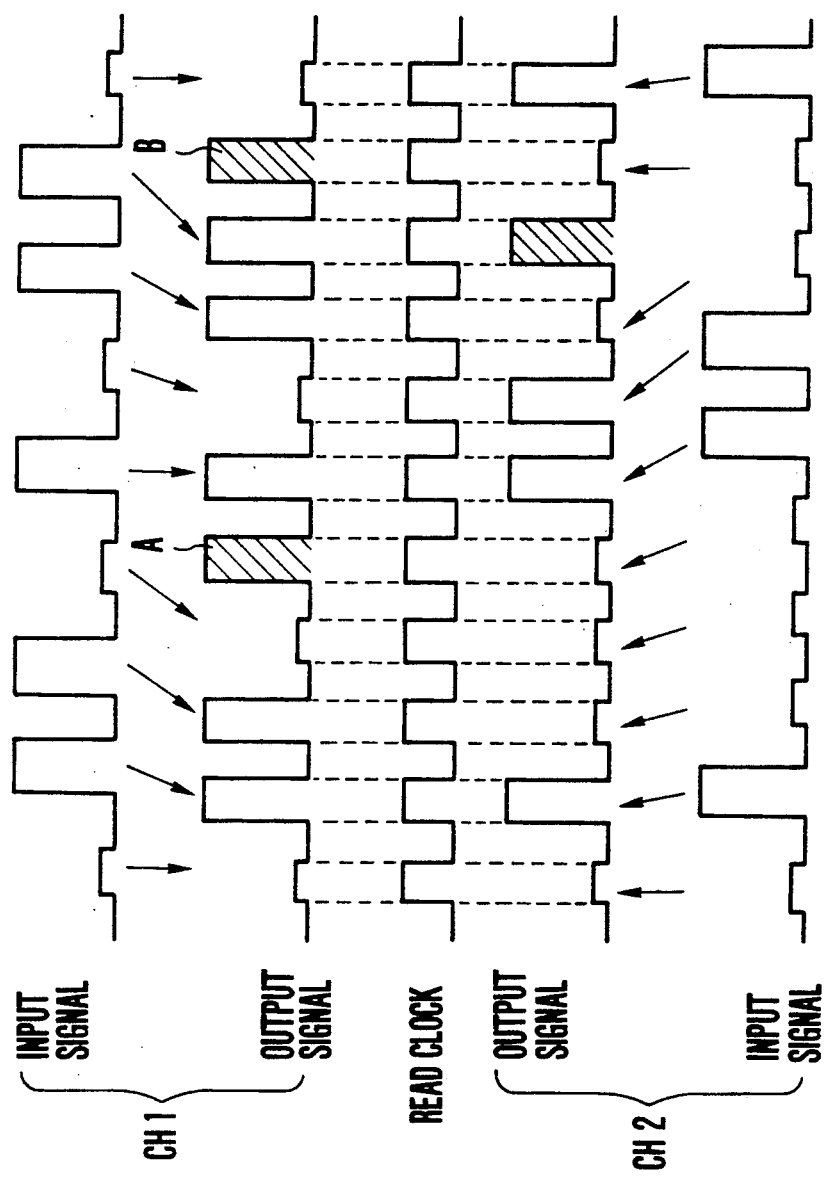
FIG. 5 is a diagram for illustrating a stuff pulse.

FIG. 5 is a diagram for illustrating stuff pulses. Since input lower-rate signals CH1 and CH2 are not synchronized, stuff pulses (shaded pulses indicating "1") are inserted into stuff pulse specified positions to attain synchronization between output signals of CH1 and CH2. For brevity, only four signals are described between stuff pulses A and B of CH1 in FIG. 5. However, according to the practical stuff ratio, several tens of signals are contained between the stuff pulses A and B. In conventional multiplexers stuff pulses shown in FIG. 5 are not provided with significant information. In the present invention, however, this stuff pulse is provided with parity information. That is to say, "1"-bits between stuff pulses are connected, and a parity bit based upon this count is inserted instead of the stuff pulse position. In the example shown in FIG. 5, three "1"-bits are included between the stuff pulses A and B, so the stuff pulse B is defined to be "0" in the odd parity case, and "1" in the even parity case. FIG. 6 shows an example of frame configuration which can be applied to the present invention. This configuration is now applied for NTT DM-45 type multiplexer. In this configuration, a parity bit (stuff pulse) for the lower-rate signal is inserted into a specified time slot (sheded region) succeeding a G pulse of a sixth G frame (G-6) included in an S frame when pulse stuffing is indicated by the stuff indication pulses. When stuff indication pulses $S_{11}$, $S_{12}$ and $S_{13}$ are "1" for CH1, for example, the parity bit is inserted into the specified time slot (shaded region) of CH1 succeeding them.

As described above, synchronized lower-rate signals are multiplexed by a multiplexing gate 11. In the G pulse insertion circuit 12, G pulses such as frame alignment pulses stuff indication pulses and auxiliary pulses are then inserted to specified positions in the multiplexed frame configuration. In the conventional scheme, an overall parity bit for multiplexed signal is conveyed by a G pulse each frame. In a multiplexer of the present invention, however, a parity bit is added for each lower-rate signal and hence it is not necessary to add a parity bit to a signal obtained after multiplexing. However, in the case a multiplexer using the present invention is opposed to a conventional multiplexer, however, additional of the latter parity bit is recommended from the viewpoint of maintenance feasibility.

In the same way as the conventional scheme, only information bits in the multiplexed signal is randomized by the scrambler 13, and its output signal is converted into a bipolar signal by the unipolar-bipolar converting section 14, and outputted.

The monitor and alarm section 15 monitors behabior of various sections of the multiplexer 1. For example, when signal input interruption is detected in the bipolar-unipolar converting section 6, or case abnormal pulse stuff ratio is detected in the stuff control circuit 8, or signal output interruption is detected in the unipolar-bipolar converting section 14, the monitor and alarm section 15 displays corresponding alarms or outputs them to an outside equipment.

The bipolar output signal of the multiplexer 1 is transmitted to the line terminal equipment 2. The line terminal equipment 2 receives it and converts into another signal form suitable for propagation on the transmission line 3 and transmits it onto the transmission line 3. The line terminal equipment 4 receives the signal propagated through the transmission line 3, regenerates the original digital signal, then converts it into a bipolar signal, and transmits the bipolar signal to the multiplexer 5. This bipolar signal has the same information as that transmitted from the multiplexer 1 to the line terminal equipment 2. When multiplexing of two stages or more is necessary, other multiplexers which are not illustrated should be inserted between the multiplexer 1 and the line terminal equipment 2 and between the line terminal equipment 4 and the multiplexer 5. Furthermore, intermediate line repeater may be used on the transmission line 3.

Figure 3:
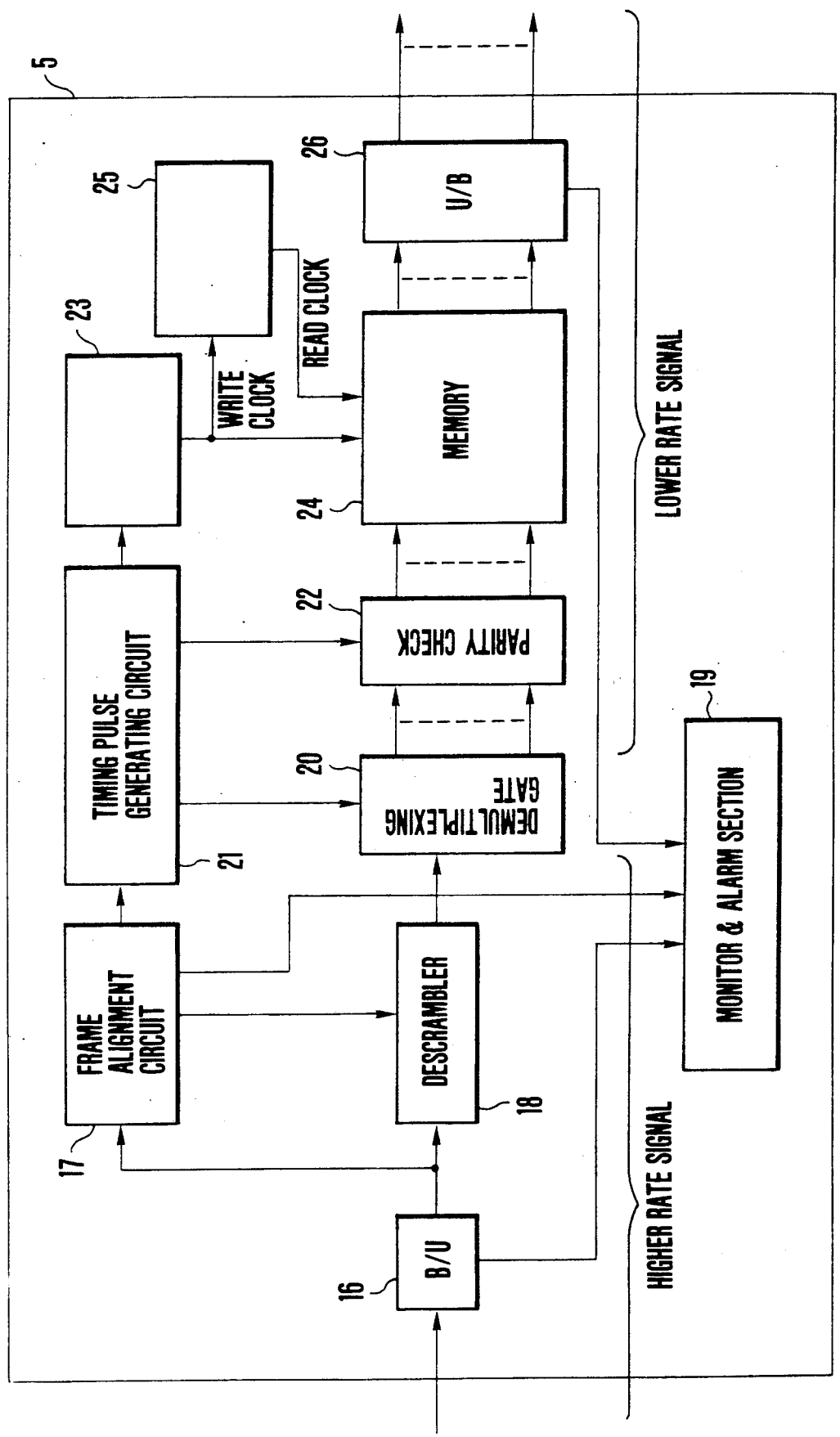
FIG. 3 is a configuration diagram of receiving function of a multiplexer according to an embodiment of the present invention.

As shown in FIG. 3, the multiplexer 5 comprises a bipolar-unipolar converting section 16 on the higher rate side, a frame alignment circuit 17, a descrambler 18, a monitor and alarm section 19, a demultiplexing gate 20, a timing pulse generating circuit 21, a parity check circuit 22, a destuff control circuit 23, a memory 24, a phase-locked loop 25, and a unipolar-bipolar converting section 26 for lower-rate signals.

In the multiplexer 5 having such configuration, the bipolar signal transmitted from the line terminal equipment 4 is received and converted into a unipolar signal by the bipolar-unipolar converting section 16. This unipolar signal is inputted to the frame alignment circuit 17. Frame alignment pulses are thus extracted and frame alignment is attained. By the descrambler 18 under resetted by the frame alignment circuit 17, the original multiplexed digital signal, i.e., the signal before passing through the scrambler 13 on the sending side is regenerated. In case parity bits for the multiplexed signal are added on the sending side, parity check is performed in the frame alignment circuit 17. When an error is detected, an error pulse is transmitted to the monitor and alarm section 19. When error pulse occurrence frequency exceeds a threshold, the monitor and alarm section 19 generates an alarm.

The multiplexed digital signal passed through the descrambler 18 is demultiplexed into respective lower-rate digital signals by the demultiplexing gate 20. Clock pulses required for the operation of the demultiplexing gate 20 are supplied from the reception timing pulse generating circuit 21. Using clock pulses and G pulses received from the frame alignment circuit 17, the timing pulse generating circuit 21 generates various timing pulses required for the operation of the demultiplexing gate 20, the parity check circuit 22 and the destuff control circuit 23.

As to each lower-rate digital signals demultiplexed by the demultiplexing gate 20, "1"s included in information bits between two stuff pulses are counted by the parity check circuit 22. The count is checked with the parity represented by the latter stuff pulse. In case of noncoincidence, the parity check circuit 22 transmits an error pulse to the monitor and alarm section 19. When the occurrence frequency of the error pulse exceeds a threshold, the monitor and alarm section 19 displays an alarm or outputs it to an outside equipment. The time of each error pulse occurrence may be stored inside or may be outputted to an outside equipment.

Since parity check is thus performed with respect to each lower-rate signal in the present invention, bit errors caused in the multiplexing process on the sending side or the demultiplexing process on the receiving side can be detected.

In order to remove stuff pulses from the lower-rate signal, memory 24 is employed. The destuff control circuit 23, which gives write clocks to memory 24, omits one write clock when it encounters a stuff pulse. In order to absorb jitters from the lower-rate signal caused by pulse destuffing and realize uniform pulse interval, the phase-locked loop 25 is employed. By using the read clocks of uniform intervals supplied from the phase-locked loop 25, data are read out from the memory 24. The output signal of the memory 24 is converted into a bipolar signal in the unipolar-bipolar converting section 26 and outputted.

The monitor and alarm section 19 monitors behabior of various sections of the multiplexer 5. Upon detection of the parity error described before, detection of signal input interruption by the bipolar-unipolar converting section 16, detection of a frame alignment error by the frame alignment circuit 17, or detection of signal output interruption by the unipolar-bipolar converting section 26, the monitor and alarm section 19 displays respective alarms or outputs them to an outside equipment.

Figure 7:
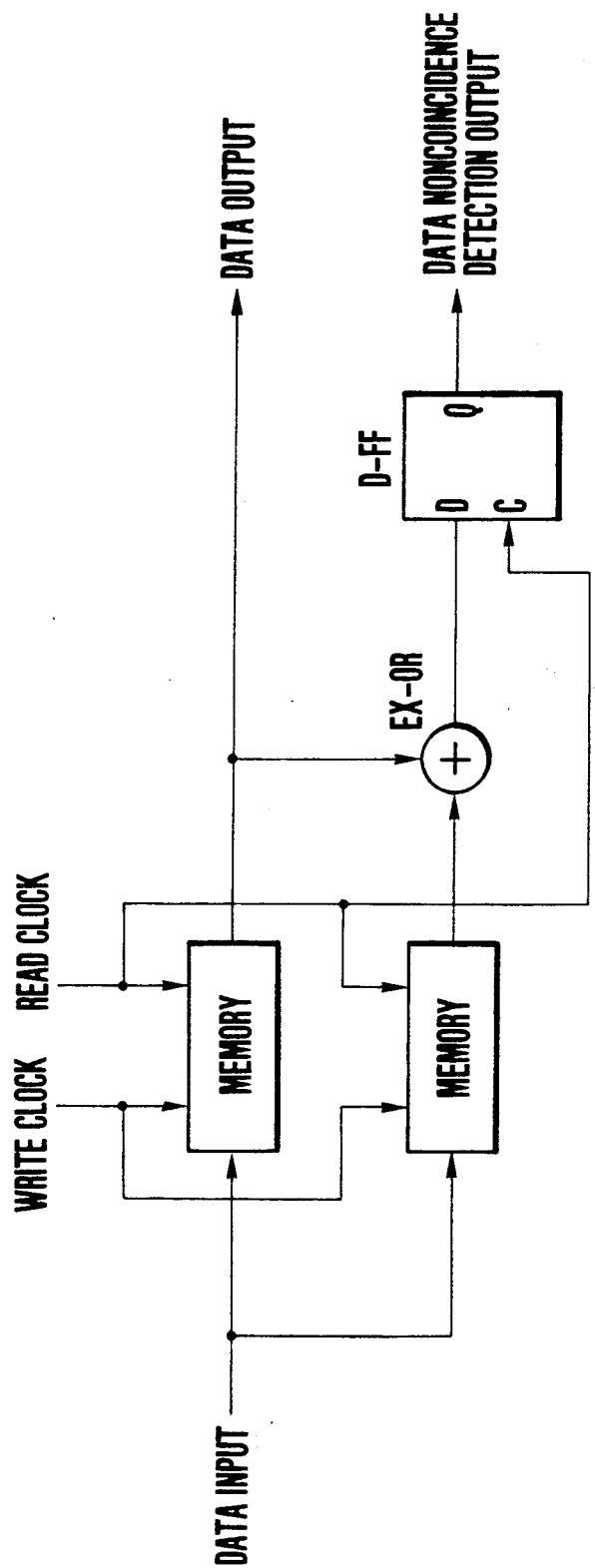
FIG. 7 shows an example of configuration for bit error detection in write/read process.

In the above mentioned embodiment, bit errors caused in the write process and read process in the memory 7 or memory 24 are not detected. However, these bit errors could be detected by duplicating the memory 7 and 24 and always monitoring whether data read out from the duplicated memory are in agreement. This can be realized by monitoring the Q output of a D type flip-flop in the configuration shown in FIG. 7. It becomes "0" if data read out from the duplicated memory agree each other, and "1" if they disagree.

By using the digital path monitoring scheme in the multiplexer describer so far automatic changeover between active and standby lines can be performed. Its embodiment will now be described by referring to FIG. 4.

In FIG. 4, 1a, 2a, 3a, 4a and 5a respectively denote a multiplexer on the sending side, a line terminal equipment on the sending side, a transmission line, a line terminal equipment on the receiving side and a multiplexer on the receiving side, which are used in the active system, whereas 1b, 2b, 3b, 4b and 5b respectively denote them in the standby system. Numeral 27 denotes a switching equipment on the sending side, 28 a switching equipment on the receiving side 29 a switching control equipment on the receiving side, 30 a control signal transmission line, and 31 a switching control equipment on the sending side.

Figure 8A:
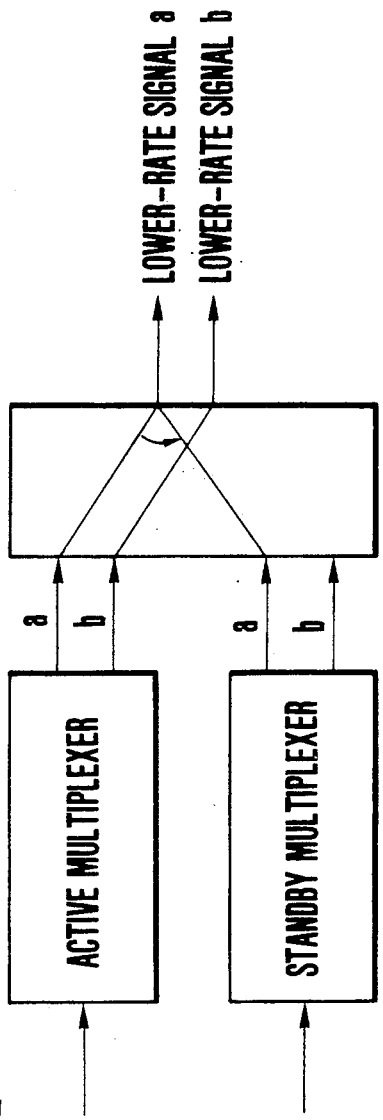
FIGS. 8A and 8B show examples of a switching scheme.
Figure 8B:
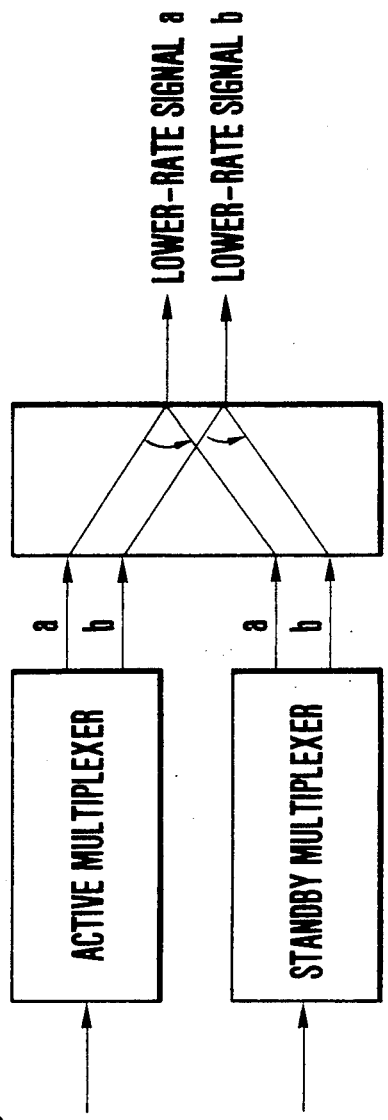

The switching equipments 27 and 28 switch the lower-rate bipolar signals from the active system to the stand-by system and vice versa. The bipolar signal is usually connected to the active system. Assuming now that a trouble occurs in the active system, parity errors are detected in the multiplexer 5a by using the aforementioned method. If the parity error occurrence frequency exceeds a threshold, an alarm for line switching is transmitted to the switching control equipment 29. Upon detecting this alarm, the switching control equipment 29 transmits a switching control signal to the switching equipment after confirming that any alarm is not generated on the standby system. Upon receiving this switching control signal, the switching equipment 28 switches the bipolar output signal connection from the active system to the standby system. On the other hand, the switching control equipment 29, transmits trouble information to the switching control equipment 31 via the control signal transmission line 30. Upon receiving this trouble information, the switching control equipment 31 controls the switching equipment 27 on the sending side and switches the bipolar input signal connection from the active system to the standby system. The above described switching may be performed for each lower-rate signal on which a trouble occurs, or performed for all the lower-rate signals en bloc. If abnormality occurs in a lower-rate a, only its connection a is switched to the standby system, whereas the lower-rate signal b connection remains unchanged. FIG. 8B shows an example of the latter case. Even if abnormality occurs only in the lower-rate group a all the lower-rate signal connection is switched from the active multiplexer to the standby multiplexer. Automatic line switching between active and standby systems can thus be performed by using the digital path monitoring scheme of the present invention.

Figure 9:
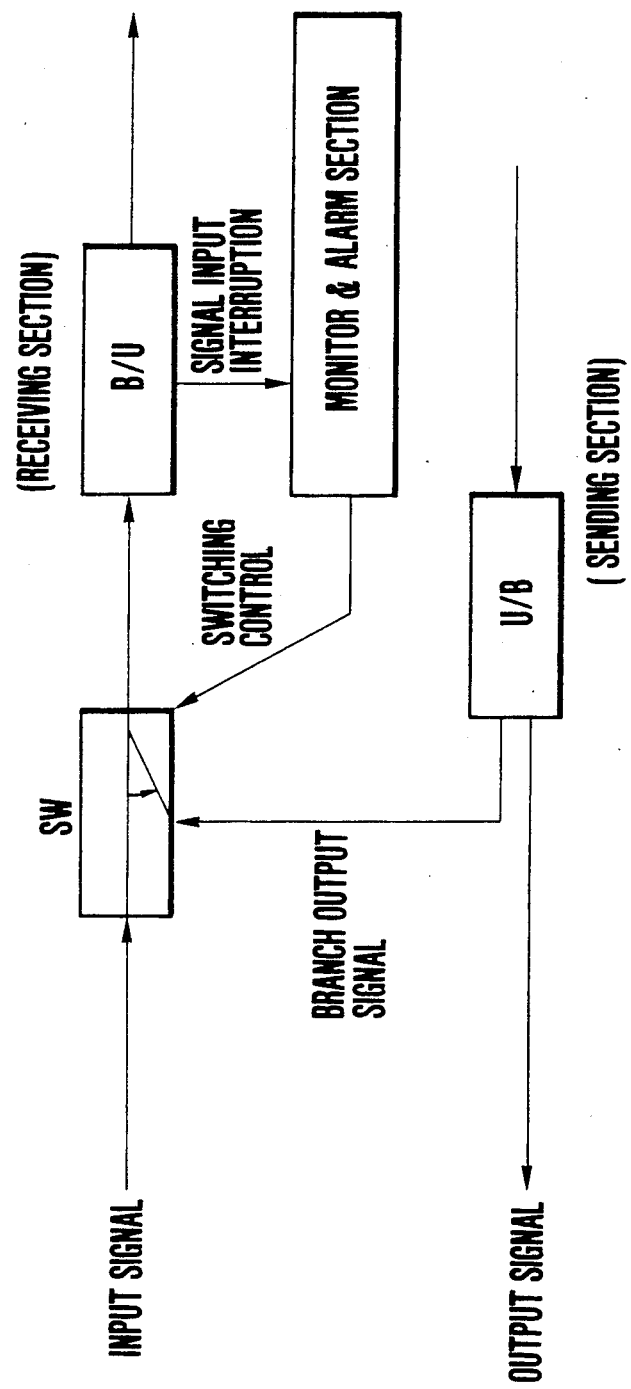
FIG. 9 shows an example of configuration for detecting trouble in a U/B conversion section and a B/U conversion section.

In the above described embodiment, digital path monitoring is performed only for the unipolar signal. Therefore, if a trouble occurs in the bipolar-unipolar converting section or the unipolar-bipolar converting section of the multiplexer, automatic line switching is not performed. However, this can be realized by detecting signal output interruption in the unipolar-bipolar converting section and signal input interruption in the bipolar-unipolar converting section. When signal input interruption in the bipolar-unipolar converting section is detected, the branch bipolar output signal of the unipolar-bipolar converting section in the opposite direction is inputted into the bipolar-unipolar converting section to test this. If signal input interruption is also detected on this test, an alarm is issued from the active multiplexer 1a to the switching control equipment 31 and this equipment informs the trouble to the switching control equipment 29 on the receiving side. FIG. 9 shows an example of the bipolar-unipolar converting section test configuration. If the bipolar-unipolar converting section (B/U) of receiving section detects signal input interruption, it informs this trouble to the monitor and alarm section. The monitor and alarm section controls a switch (SW) to connect the branch signal output from the unipolar-bipolar converting section of transmitting section to the bipolar-unipolar converting section of receiving section. If input interruption is also detected on this test, the monitor and alarm section generates an alarm signal for automatic switching from the active system to the standby system.

Figure 4:
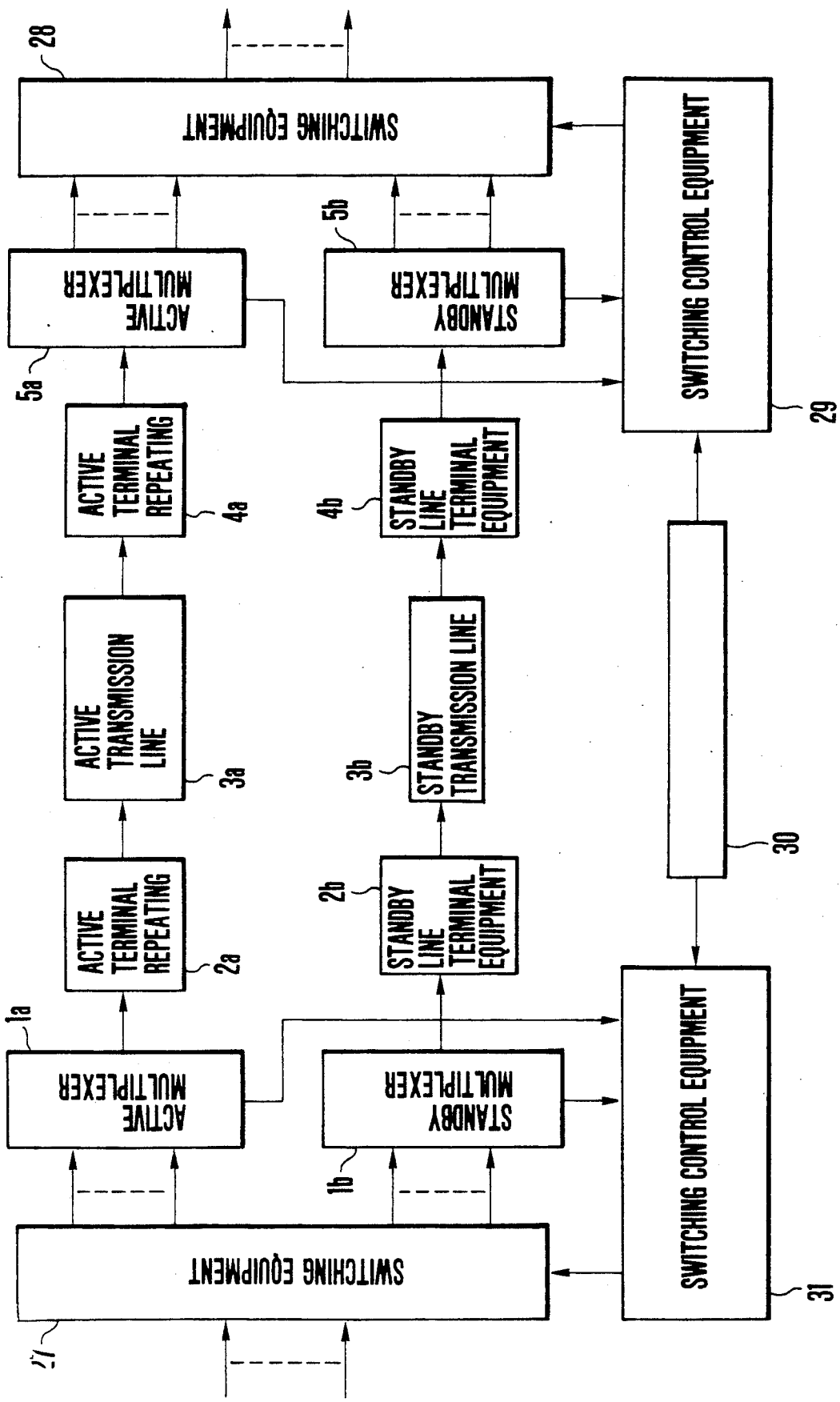
FIG. 4 is a system configuration diagram obtained when a duplex communication system is formed by using the multiplexer shown in FIGS. 1 and 3.

In the embodiment of FIG. 4, one standby system is prepared for one active system. However, the switching method mentioned above can also be expanded to a system configuration having the ratio of N:1, i.e., a system configuration using one standby system for N active systems in common.

In digital path monitoring between opposing multiplexers, afore mentioned embodiments make it possible to detect bit errors caused in the multiplexing process and the demultiplexing process only by adding the parity bit inserting circuit and the parity check circuit. As a result, the monitored section is expanded by adding a simple hardware. Therefore, this invention is extremely effective in improving the reliability of the transmission system.

What is claimed is:

1. A digital communication system having active and standby multiplexers both on the sending side and the receiving side, comprising:
   each multiplexer comprising:
   means for counting "1"s included in information bits sandwiched by two stuff pulses for each lower-rate signal;
   means for inserting a parity bit corresponding to the number of "1"s derived by said counting means into the latter stuff pulse insertion position which appears just after the counting;
   means for multiplexing lower-rate signals with said parity bits inserted into a higher-rate signal;
   means for demultiplexing the higher-rate into lower-rate signals;
   means for counting "1"s included in information bits sandwiched by two stuff pulses for each lower-rate signal derived by said demultiplexing means;
   means for checking the number of "1"s thus counted with the parity bit which appears just after the counting; and
   means for analyzing the check result and for generating an alarm signal, when the mismatch frequency between the number of "1"s and the parity presentation exceeds a threshold;
   a standby multiplexer being set up in parallel with an active one; and
   means for switching signal lines from the active multiplexer to the standby one and vice versa, according to said alarm signal.

2. A digital communication system according to claim 1, further comprising:
   a unipolar-bipolar converting section for converting unipolar signals to bipolar signals;
   means for detecting output signal interruption of the unipolar-bipolar converting section and for generating an alarm signal;
   a bipolar-unipolar converting section for converting bipolar signals to unipolar signals;
   means for detecting input signal interruption of the bipolar-unipolar converting section, for inputting a branch bipolar output signal of said unipolar-bipolar converting section in the opposite direction into the unipolar-bipolar converting section to perform a test, and for generating an alarm upon detecting the input signal interruption again in the unipolar-bipolar converting section as a result of the test; and
   means for signal line connection switching from the active multiplexer to the standby multiplexer and vice versa in response to any of said alarms.

3. A stuff multiplexer according to claim 1, further comprising means for adding parity bits for a higher-rate signal.

4. A stuff multiplexer according to claim 3, further comprising a frame alignment circuit having a parity check function for the received higher-rate signal and for generating an alarm signal upon detecting a parity mismatch.

* * * * *